Sept. 18, 1956 W. F. ALLER 2,763,067
BORE GAUGING DEVICE
Filed July 17, 1953
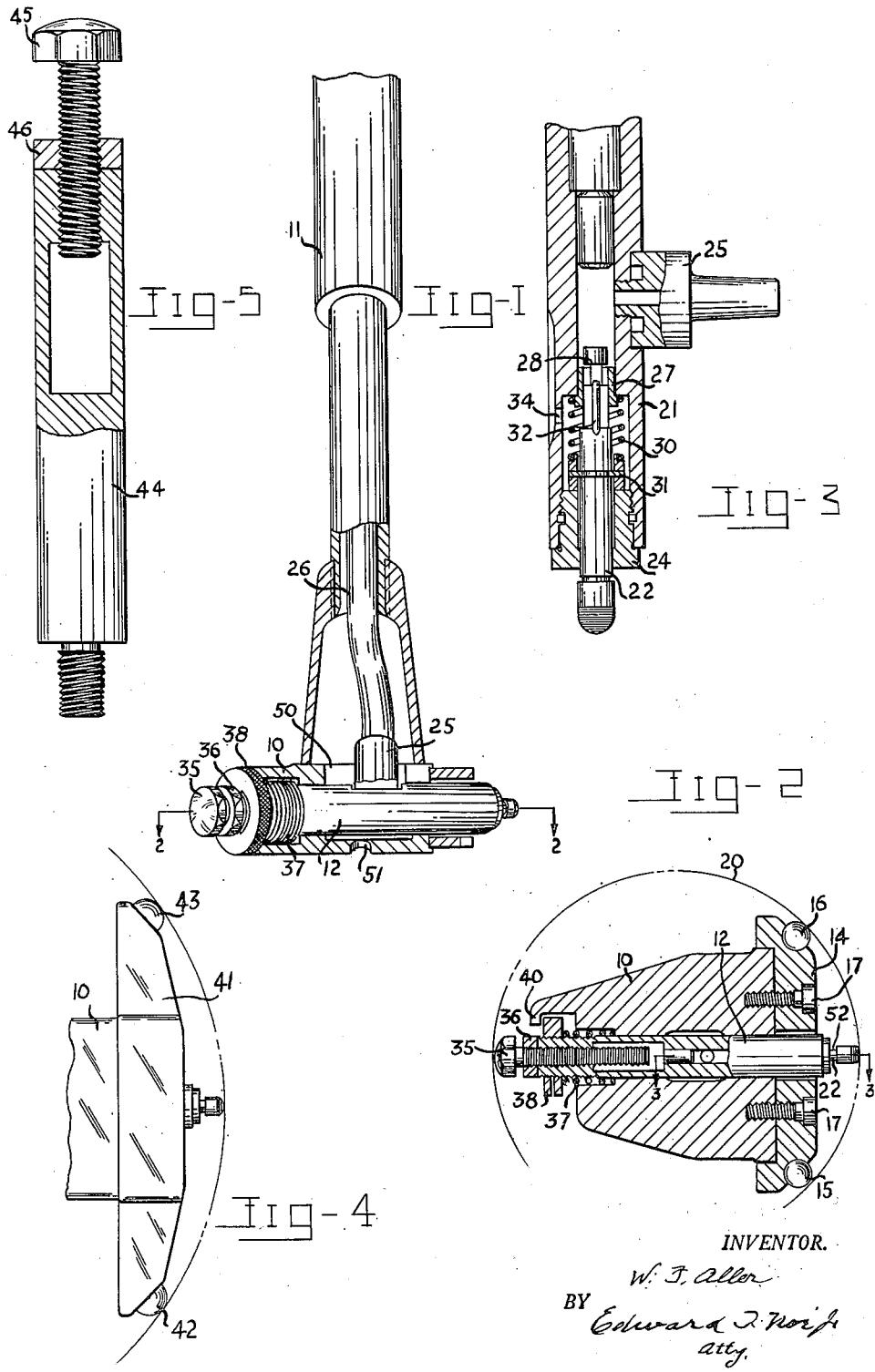
INVENTOR.
W. F. Aller
BY Edward J. Noi Jr
atty.

2,763,067
Patented Sept. 18, 1956

2,763,067

BORE GAUGING DEVICE

Willis Fay Aller, Dayton, Ohio, assignor to The Sheffield Corporation, Dayton, Ohio, a corporation of Ohio Application July 17, 1953, Serial No. 368,654

12 Claims. (Cl. 33—178)

This invention relates to the field of bore gauges.

It is an object of this invention to provide a gauge for measuring bore diameters by means of a gauging member having a pair of opposed bore wall contacting members cooperating for diameter measurement and including means supporting the gauging member for bodily movement along a bore diameter.

It is a further object to provide such a gauge wherein the supporting means has locating contacts for cooperation with points at each end of a bore chord line, the gauging member being carried for bodily movement in the supporting means along a line perpendicular to the midpoint of the chord line defined by the locating contacts and along a bore diameter.

It is a further object to provide such a gauge wherein the gauging member has a work contactor fixed at one end thereof and a relatively heavy spring urges the work contactor and locating contacts into contact with opposite sides of the bore wall for a locating function and in which the gauging member carries a movable work contacting element at its other end adjacent to and equidistant between the locating contacts which is urged into contact with the bore wall by a relatively light spring for the gauging function.

It is a further object to provide a gauge for bore diameters comprising a gauging member having a pair of opposed bore wall contacting members cooperating to control a fluid leakage orifice in accordance with the bore diameter, the gauging member being carried for bodily movement in a supporting means which locates the gauging member along a bore diameter.

It is a further object to provide a bore gauge of the character referred to which is simply set up for a gauging operation and which is readily adaptable for gauging bores of a wide range of diameters.

Other objects and advantages of the invention will be apparent from the following description, the appended claims, and the accompanying drawing, in which:

Figure 1 is a perspective view in partial section of a gauge head embodying the present invention, Figure 2 is a sectional view taken along line 2—2 of Figure 1, Figure 3 is a sectional view on an enlarged scale of the gauging member taken along line 3—3 of Figure 2, Figure 4 is a view showing the gauge head of the present invention with an extended work contactor support adapted for gauging bores of large diameters, and Figure 5 illustrates in partial central section and on an enlarged scale an extension for the movable gauging member of the gauge head for use in gauging bores of large diameters.

The bore gauge of this invention is intended for use with an indicating instrument. The specific embodiment illustrated as an example of this invention is used with an instrument of the air velocity flow or back pressure type. The leakage flow of air under pressure supplied to the gauge head is controlled in accordance with the bore diameter and the associated instrument is responsive to this leakage flow and is calibrated for dimension measurement or comparisons.

In the embodiment illustrated for the purposes of disclosing the present invention the gauge comprises a supporting member 10 which has a handle 11 attached thereto. A gauge member 12 is carried for bodily movements in the supporting member 10 in a gauging operation. The supporting member 10 may have a generally triangular configuration as shown in Figure 2. A foot portion 14 having balls 15 and 16 fixed at each end thereof is detachably fastened along one side of the supporting member 10 by screws 17, 17. These balls 15 and 16 are provided to contact the bore wall and define a bore chord line. The supporting member 10 is so designated as to carry the gauging member 12 for bodily sliding along a line perpendicular to the midpoint of the chord line defined by the contacts 15 and 16.

The gauging member 12 has a work contactor 35 threaded into it at one end and adjustably fixed thereon by a lock nut 36. The work contactor 35 can be adjusted to effectively vary the length of the gauging member 12 by releasing the lock nut 36 and unscrewing the work contactor 35 to the desired position. A relatively heavy spring 37 is seated in the supporting member 10 and acts against an adjustable nut 38 threaded along one end of the gauging member 12. This adjustable nut member 38 cooperates with an inwardly turned stop projection 40 on the supporting member 10 to limit the movement of the gauging member 12 relative to the supporting member 10 under the urging of the relatively heavy spring 37 and serves also to position the gauging member 12 along the hole which carries it for axial sliding in the supporting member 10. It will be seen that spring 37 acting between the gauging member 12 and the supporting member 10 will bias the work contactor 35 into contact with one side of the bore wall and the locating contacts 15, 16 into contact with the opposite side of the bore wall, thus aligning the gauging member 12 along a bore diameter.

The gauging member 12 comprises a body 21 formed as a longitudinally extended cylinder which carries a work contacting spindle element 22 for axial sliding at one end thereof in a bushing member 24. The work contacting element 22 is urged outward into engagement with the bore wall and relative to the gauging member 12 by a spring 30 which acts against a snap ring 31 seated in a groove in the work contacting element 22. This snap ring 31 also serves to limit the outward movement of the spindle relative to the gauging member cylindrical body 21. The spring 30 is light as compared with the spring 37 and serves only to keep the work contacting element 22 in contact with one side of the bore wall. The locating function is performed by the relatively heavy spring 37. Thus it will be seen that the gauging member body portion 21 is positioned by the work contactor 35 at one end thereof upon its engagement with the bore wall and that the work contacting element 22, which is carried for axial sliding in the body portion 21, is positioned upon its contact with a diametrically opposite point on the bore wall and these components are relatively positioned in accordance with the dimension of a true diameter of the bore being gauged to perform their gauging function.

Figure 3 discloses a gauging member for the purposes of disclosing the present invention which contains an adjustable leakage orifice controlled in accordance with the bore diameter. An air supply coupling 25 communicates with a central longitudinal passage in the body 21 of the gauging member 12. As shown in Figure 1 this coupling 25 joins a flexible tube 26 which passes along the axis of the handle 11 to a suitable air supply and air gauging instrument (not shown). The inner end of the work contacting element 22 is carried for axial sliding in an orifice forming sleeve 27 and a surface 28 on the element 22 is positioned in accordance with the movements of the work contacting element 22 to control the flow of air through the orifice forming sleeve which is in turn positioned by the engagement of the work contactor 35 with the opposite bore wall. Air is supplied under pressure through the tube 26, the coupling 25, passes through the orifice forming sleeve 27 where its flow is controlled in accordance with the bore diameter, then passes along grooves 32 in the work contacting element surface and outward through passages 34 to atmosphere.

It will be seen from Figure 1 that the supporting member 10 has a slot 50 along one side along which the air supply connection 25 can slide without interference upon movement of the gauging member 12 during the gauging operation. Also in that figure is seen the passage 51 which allows air which is exhausted from the gauging member 12 to pass out through the supporting member 10 to atmosphere.

The entire association is illustrated in Figure 2 wherein the ball contacts 15 and 16 are shown in contact with the phantom outline 20 of a bore wall. In practice the gauge is inserted in the bore to be gauged and the handle 11 is aligned along the axis of the bore; this handle alignment and the locating function of the contacts 15 and 16 serve to position the gauge head for a gauging operation. As therein shown the relative movement between the gauging member 12 and the work contacting element 22 controls the adjustable orifice in accordance with the bore diameter. The work contacting element 22 protrudes from the gauging member 12 at the end thereof which passes equidistantly between the work contacting balls 15 and 16 and adjacent thereto.

The range of relative movement between the work contacting element 22 and the gauge body portion 21 is limited in accurate gauging operations. In order to adapt the gauge head of this invention for the gauging of a wide range of bore diameters, attachments are provided. Figure 4 illustrates a foot portion 41 having hole contactors 42 and 43 which are relatively spaced a greater distance than the contactors shown in Figure 2 and are therefore adapted for positioning the supporting member 10 and the gauging member 12 for proper gauging along a diameter of a much larger bore. This foot portion 41 is readily secured to the supporting member 10 by the screws 17, 17 and is substituted for the smaller foot portion 14 when gauging bores of larger diameters.

Figure 5 illustrates an extension member 44 which can be screwed into one end of the gauging member body portion in lieu of the work contactor 35. This extension 44 carries a work contactor 45 which is adjustably fixed at its outer end by a lock nut 46 in a manner corresponding to that of the work contactor 35 and its adjustment relative to the gauging member 12. Extensions 44 are provided having various lengths for cooperation with the alternatively usable foot portions. Thus it is seen that the gauging head of this invention is almost universally adaptable for gauging bores of small and large diameters.

In setting up the gauge head of this invention for a gauging operation where, for example, it is to be determined whether bore diameters are within a given tolerance range, the following steps may be taken. Feeler elements can be provided for insertion between the inner surface of the head of the work contacting element 22 and the outer surface of the bushing 24 at 52 as indicated in Figure 2. It will be seen that by closing these two surfaces about inserted feelers of predetermined differences in thickness predetermined differences in orifice openings can be obtained. Two feelers can be utilized having a difference in thickness equal to the tolerance range of the gauging operation. The smaller feeler is inserted at 52 and the work contactor 35 and work contacting element 22 are positioned between reference surfaces having a distance therebetween equaling the smaller limit diameter of the hole to be gauged. The work contactor 35 is then adjusted outwardly until both work contacting means are in contact with the reference surfaces and the inner surface of the work contacting element head and outer bushing surface are closed against the feeler. The lock nut 36 is then tightened to fix the work contactor 35 in that position. At the same time the associated indicator is adjusted to indicate at the lower tolerance limit. Then as a further check the thicker of the feeler elements is used and the instrument will indicate at the upper tolerance limit if it is properly adjusted. Thus is seen one method by which the gauge head can be readily set up for any gauging operation.

It will now be apparent that the gauge head of this invention is ruggedly and simply constructed but adapted for gauging operations of extreme accuracy. It can be used with any one of a great number of commercially available indicating instruments of varying amplifications. The gauge is located accurately for gauging along the bore diameter by the relatively heavy spring which acts between the gauging member work contactor and the support member carried locating contacts. The gauging member carried work contacting element is urged into contact with the bore wall by a relatively light spring with a light gauging pressure. By reason of its adaptability by using foot portions of different lengths and various extension members it can be quickly assembled for gauging bores of almost any diameter.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A gauge head for diametral bore measurement comprising a support member, a handle fixed to and extending from said support member, an elongated gauging member slidably mounted in said support member for longitudinal floating movement in gauging, a work contactor fixed at one end of said gauging member, a work contacting element carried in said gauging member at the other end thereof and for sliding movement relative thereto, cooperating means on said work contacting element and in said gauging member relatively positioned in accordance with the bore diameter during a gauging operation, means carried by said support member for contact with the bore wall at two spaced chordal points adjacent to and on opposite sides of the work contacting element, said gauging member being carried in said support member for axial sliding along a line perpendicular to the midpoint of a line defined by the chordal support contact points, whereby the gauging member is aligned for gauging along a bore diameter.

2. A gauge head for diametral bore measurement comprising a support member, a handle fixed to and extending from said support member, an elongated gauging member slidably mounted in said support member for longitudinal floating movement in gauging, a work contactor fixed at one end of said gauging member, a work contacting element carried in said gauging member at the other end thereof and for sliding movement relative thereto, cooperating means on said work contacting element and in said gauging member relatively positioned in accordance with the bore diameter during a gauging operation, means rigidly fixed to said support member for contact with a bore wall at two spaced chordal points adjacent to and on opposite sides of the work contacting element, said gauging member being carried in said support member for axial sliding along a line perpendicular to the midpoint of a line defined by the chordal support contact points, whereby the gauging member is aligned for gauging along a bore diameter.

3. A gauge head for diametral bore measurement comprising a support member, a handle fixed to and extending from said support means an elongated gauging member slidably mounted in said support member for longitudinal floating movement relative thereto in gauging, a work contactor, means detachably and adjustably fixing said work contactor at one end of said gauging member, a work contacting element carried in said gauging member at the other end thereof and for sliding movement relative thereto, said work contactor and said work contacting element being positioned relatively by diametrically opposed points in a bore wall during a gauging operation, a foot portion having spaced contacts fixed thereto for contact with the bore wall at two chordal points, means detachably fixing said foot portion to said support member with said contact points adjacent to and on opposite sides of the work contacting element, said foot portion having a passage through the midpoint thereof through which the gauging member extends, said gauging member being carried in said support member for axial sliding along a line perpendicular to the midpoint of a line defined by the chordal support contact points, whereby the gauging member is aligned for gauging along a bore diameter.

4. A gauge head for diametral bore measurement comprising a support member, a handle fixed to and extending from said support member an elongated gauging member slidably mounted in said support member for longitudinal floating movement relative thereto in gauging, a work contactor, means detachably and adjustably fixing said work contactor to one end of said gauging member, a work contacting element carried in said gauging member at the other end thereof and for sliding movement relative thereto, cooperating means on said work contacting element and in said gauging member forming an adjustable orifice outlet, foot means including spaced contacts for contact with the bore wall at two chordal points, means detachably fixing said foot means to said support member with said spaced contacts adjacent to and on opposite sides of the work contacting element, said gauging member being carried in said support member for axial sliding along a line perpendicular to the midpoint of a line defined by the chordal support contact points, whereby the gauging member is aligned for gauging along the bore diameter, and a flexible conduit leading through said support means and to said adjustable orifice adapted for connection to a source of air under pressure and an air gauge.

5. A gauge head for diametral bore measurements comprising a support member, a handle fixed to and extending from said support member, an elongated gauging member slidably mounted in said support member for longitudinal movement, a work contactor at one end of said gauging member, a work contacting element carried in said gauging member at the other end thereof and for sliding movement relative thereto, means cooperating between said gauging member and said work contacting element urging said element into contact with the bore wall, cooperating means on said work contacting element and in said gauging member relatively positioned in accordance with the bore diameter in a gauging operation, locating means fixed to said support member for contact with a bore wall at two spaced chordal points adjacent to and on opposite sides of the work contacting element, said gauging member being carried in said support member for axial sliding relative thereto in gauging along a line perpendicular to the midpoint of a line defined by the chordal support contact points, means cooperating between said support member and said gauging member urging said gauging member and its work contactor into contact with one side of the bore wall and the locating means into contact with the opposite side of the bore wall, whereby the gauging member is aligned for gauging along a bore diameter.

6. A gauge head for diametral bore measurements comprising a support member, a handle fixed to and extending from said support member, an elongated gauging member slidably mounted in said support member for longitudinal floating movement relative thereto in gauging, an adjustably fixed work contactor at one end of said gauging member, a work contacting element carried in said gauging member at the other end thereof and for sliding movement relative thereto, means cooperating between said gauging member and said work contacting element urging said work contacting element outward relative to the gauging member and into contact with the bore wall and means limiting the outward movement of the work contacting element relative to the gauging member, cooperating means on said work contacting element and in said gauging member forming an adjustable orifice outlet, locating means fixed to said support member for contact with a bore wall at two spaced chordal points adjacent to and on opposite sides of the work contacting element, said gauging member being carried in said support member for axial sliding perpendicular to the midpoint of a line defined by the chordal support contact points, means cooperating between said support member and said gauging member urging said work contactor into contact with one side of the bore wall and the locating means into contact with the opposite side of the bore wall, whereby the gauging member is aligned for gauging along a bore diameter, adjustable limit means cooperating between said support member and said gauge member for adjustably determining the floating movement of the gauging member relative to the support member, and a flexible conduit leading through said handle and said support member to said adjustable orifice adapted for connection to a source of air under pressure and an air gauge.

7. A gauge head for diametral bore measurements comprising a support member, a handle fixed to and extending from said support member, an elongated gauging member slidably mounted in said support member for longitudinal floating movement in gauging, a work contactor at one end of said gauging member, a work contacting element carried in said gauging member at the other end thereof and for sliding movement relative thereto, means urging said work contacting element outward relative to said gauging member and into contact with the bore wall, cooperating means on said work contacting element and in said gauging member forming an adjustable orifice outlet, locating means carried by said support member for contact with a bore wall at two spaced chordal points adjacent to and on opposite side of the work contacting element, said gauging member being carried in said support member for axial sliding relative thereto along a line perpendicular to the midpoint of a line defined by the chordal support contact points, means cooperating between said support member and said gauging member urging the gauging member work contactor into contact with one side of the bore wall and the locating means into contact with the opposite side of the bore wall, whereby the gauging member is aligned for gauging along a bore diameter, a fixed stop projection on said support member, and a stop means adjustable along the length of the gauging member cooperating with said fixed stop to determine the movement of the gauging member relative to the support member and the position of the gauging member in the support member and a flexible conduit leading through said support means and to said adjustable orifice adapted for connection to a source of air under pressure and an air gauge.

8. A gauge head for diametral bore measurement comprising a support member, a handle fixed to and extending from said support member, an elongated gauging member slidably mounted in said support member for longitudinal floating movement relative thereto in gauging, a work contactor at one end of said gauging member, a work contacting element carried in said gauging member at the other end thereof and for sliding movement relative thereto, relatively light spring means carried coaxially in said gauging member and cooperating between said gauging member and said work contacting element urging said work contacting element into contact with the bore wall, said work contactor and said work contacting element being relatively positioned by diametrically opposed points in a bore wall during a gauging operation, locating means fixed to said support member for contact with a bore wall at two spaced chordal points adjacent to and on opposite sides of the work contacting element, said gauging member being carried in said support member by axial sliding along a line perpendicular to the midpoint of a line defined by the chordal support contact points, a relatively heavy spring means cooperating between said support member and said gauging member urging said gauging member and its work contactor into contact with one side of a bore wall and the locating means into contact with the opposite side of the bore wall, whereby the gauging member is aligned for gauging along a bore diameter.

9. A gauge head for diametral bore measurement comprising a support member, an elongated gauging member slidably mounted in said support member for longitudinal movement relative thereto in gauging, a work contactor, means detachably and adjustably fixing said work contactor at one end of said gauging member, a work contacting element carried in said gauging member at the other end thereof and for sliding movement relative thereto, relatively light spring means carried by said gauging member and cooperating between said gauging member and said work contacting element urging said work contacting element into contact with the bore wall, cooperating means on said work contacting element and in said gauging member relatively positioned in accordance with the bore diameter in a gauging operation, a foot portion having a pair of spaced chordal contact points fixed thereto, means detachably fixing said foot portion to said support member with the spaced contact points adjacent to and on opposite sides of the work contacting element, said gauging member being carried in said support member for axial sliding along a line perpendicular to the midpoint of a line defined by the chordal support contact points, relatively heavy spring means cooperating between said support member and said gauging member urging said work contactor into contact with one side of the bore wall and the chordal contact points into contact with the opposite side of the bore wall, whereby the gauging member is aligned for gauging along the bore diameter.

10. A gauge head for measuring bore diameters comprising a support member, a handle fixed to and extending from said support member, an elongated gauging member slidably mounted in said support member for longitudinal movement relative thereto in gauging, a work contactor adjustably fixed at one end of the gauging member, a projecting work contacting element carried by said gauging member at its other end for axial movement relative thereto, a relatively light spring means carried by said gauging member urging said work contacting element into contact with the bore wall, means cooperating between the gauging member and said work contacting element limiting the outward movement of the work contacting element, cooperating means on said work contacting element and in said gauging member forming an adjustable orifice outlet, locating means fixed to said support member for contact with the bore wall at two spaced chordal points adjacent to and on opposite sides of the work contacting element, said gauging member being carried in said support member for bodily axial floating movement in said supporting member during gauging along a line perpendicular to the midpoint of a chordal line defined by said locating means, a relative strong spring acting between said gauging member and said support member urging said gauging member work contactor and said locating means into contact with opposite sides of the bore wall whereby the gauging member is aligned for measurement along a bore diameter, adjustable means cooperating between the gauging member and said support member to limit the relative movement between the gauging member and the support member, and a flexible conduit leading to said adjustable orifice outlet and adapted for connection to a source of air under pressure and an air gauge.

11. A gauge head for measuring bore diameters comprising a support member, a handle fixed to and extending from said support member, foot means detachably fixed to said support member and carrying fixed contacts at each end thereof for contacting the bore wall at each end of a chord line, a cylindrical gauging member, a work contactor, means detachably and adjustably fixing said work contactor at one end of the gauging member, a projecting work contacting spindle element carried by said gauging member at its other end in coaxial relationship therewith for axial sliding relative thereto, relatively weak spring means coacting between said gauging member and said work contacting spindle element urging said work contacting spindle element into contact with the bore wall, stop means cooperating between the gauging member and the work contacting spindle element limiting the outward movement of the work contacting spindle element, an orifice outlet in said gauging member, a surface adjacent the inner end of the work contacting spindle element cooperating with said orifice outlet to vary said orifice outlet in accordance with the relative movement between the gauging member and the work contacting spindle element, said support member and said foot means having a hole passing therethrough perpendicular to the midpoint of a chordal line defined by the fixed contacts, said gauging member being mounted in said hole for bodily axial movement relative to said supporting member and foot means in gauging and with the work contacting spindle element adjacent to an equidistant from said fixed contacts, an adjustable member threaded on said gauging member, relatively strong spring means acting between said adjustable member and said support member urging said gauging member work contactor and said support member fixed contacts into contact with opposite sides of the bore wall whereby the gauging member is aligned for measurement along the bore diameter, a stop projection on said support member opposing the outward side of said adjustable member, a flexible connection to said adjustable orifice outlet in said gauging member adapted for connection to a source of air under pressure and an air gauge.

12. A gauge head for diametral bore measurement comprising a support member, a handle fixed to and extending from said support member, an elongated gauging member slidably mounted in said support member for longitudinal floating movement in gauging, a work contactor fixed at one end of said gauging member, a work contacting element carried in said gauging member at the other end thereof and guided for movement relative thereto coaxially with the line of floating movement of the gauging member, cooperating means on said work contacting element and in said gauging member relatively positioned in accordance with the bore diameter during a gauging operation and constituting an air leakage orifice of variable size, means carried by said support member for contact with the bore wall at two spaced chordal points adjacent to and on opposite sides of the work contacting element, said gauging member being carried in said support member for axial sliding along a line perpendicular to the midpoint of a line defined by the chordal support contact points, whereby the gauging member is aligned for gauging along a bore diameter.

References Cited in the file of this patent

UNITED STATES PATENTS

| 2,490,375 | Rupley | Dec. 6, 1949 |
| 2,590,170 | Gates | Mar. 25, 1952 |
| 2,654,157 | Eisele | Oct. 6, 1953 |